Nov. 25, 1952 F. A. KOLSTER 2,619,596

MULTIBAND ANTENNA SYSTEM

Filed Nov. 12, 1948 3 Sheets-Sheet 1

INVENTOR.
FREDERICK A. KOLSTER
BY Donald K. Lippincott
ATTORNEY

MULTIBAND ANTENNA SYSTEM

Filed Nov. 12, 1948 3 Sheets-Sheet 2

INVENTOR.
FREDERICK A. KOLSTER
BY Donald K. Lippincott
ATTORNEY

Nov. 25, 1952 | F. A. KOLSTER | 2,619,596

MULTIBAND ANTENNA SYSTEM

Filed Nov. 12, 1948 | 3 Sheets-Sheet 3

INVENTOR.
FREDERICK A. KOLSTER
BY Donald K. Lippincott
ATTORNEY

Patented Nov. 25, 1952

2,619,596

UNITED STATES PATENT OFFICE 2,619,596

MULTIBAND ANTENNA SYSTEM

Frederick A. Kolster, Hollywood, Calif.; Muriel Kolster administratrix of said Frederick A. Kolster, deceased Application November 12, 1948, Serial No. 59,485

9 Claims. (Cl. 250—33)

This invention relates to antenna systems, and particularly to antenna systems adapted to transmit or receive signals on a plurality of channels distributed in more than one band of frequencies. This situation obtains with regard to the channels presently assigned to television and frequency modulation broadcasts. One group of television channels (channels 1 to 6) lies within the range from 48 to 90 megacycles. Immediately above this band is a 20-megacycle band assigned to frequency modulation. No other channels are assigned for popular use up to 170 megacycles, where there is a band about 45 megacycles wide within which are assigned television channels 7 to 13, inclusive.

Taken collectively, these bands cover a frequency range of about 4½ to 1, and the public not only desires but is entitled to reception on all three bands.

The most widely used, and, for many purposes the most generally desirable antenna for any of these bands, is a simple half-wave dipole. Such antennas are characterized by a reception or radiation pattern which is a simple figure of 8, picking up maximum energy when the antenna is broadside on to the incoming radiation and having a null to radiation received end on. This situation still obtains where the length of the antenna does not depart too greatly from the half wave length condition. Where, however, a full wave length dipole is used, the figure-of-8 pattern is transformed into a 4-lobed pattern, two additional nulls or, at least, deep indentations between the lobes. An antenna 1½ wave lengths long acquires two additional lobes, and the pattern becomes increasingly complex as the length of the antenna increases with respect to the wave length.

In view of these facts it will be seen that it is difficult to receive upon all of the channels devoted to public entertainment with a single antenna. If this is attempted with an antenna designed for maximum reception in the highest of the frequency bands, it becomes an extremely poor receiver on the two lower bands. On the other hand, if it be attempted to receive the higher frequencies on an antenna which is a half wave long for the lower frequencies, its reception or radiation pattern becomes very complex on the high frequencies, and when it is desired to use it for reception of signals originating in a number of different directions, the matter of its orientation becomes very difficult and frequently impossible, since only a few degrees difference may easily make the difference between maximum reception and a null where no reception at all is possible.

The two nulls of the simple half-wave dipole do not cause this difficulty, and are, in fact, frequently highly advantageous. In the figure-of-8 pattern the lobes are very broad and the nulls very sharp. The antenna may be rotated 60 degrees from its direction of maximum reception before its input is cut to half, and it is therefore frequently possible so to rotate the antenna as to eliminate an undesired reflection or interfering signal without materially affecting reception of the desired one.

In the case of the entertainment bands, therefore, the width of the lower television band and the frequency modulation band, taken together, present about the widest frequency range that can be tolerated without compromising receiving efficiency too greatly. For satisfactory reception, therefore, at least two antennas must be provided.

Where two antennas are used, best practice would appear to dictate that they be entirely separate and be fed by separate transmission lines. This is usually undesirable, not only from aesthetic and structural considerations, but because it also involves switching from one transmission line to another at the point where the receiving equipment is actually installed. At times it has been attempted to feed the two antennas in parallel from the same transmission line, but the effect of this may be still further to complicate the lobed pattern of the array.

In view of the above, therefore, among the objects of this invention are to provide an antenna array which will be equally efficient on a plurality of bands; to provide an antenna array which has a substantially undistorted figure-of-8 reception pattern on all of the frequencies for which it is designed; to provide an antenna array in which the units functioning on the several bands may be individually oriented with respect to their directions of maximum reception; to provide an array of individual units which may be stacked to form a composite array having a higher gain; and to provide an array which is economical in construction, neat in appearance, and requires a minimum of maintenance.

Other objects and features of my invention will become apparent or will be described in the ensuing descriptions, taken in connection with the accompanying drawings wherein.

Considered broadly, the antenna of my invention comprises a pair of dipoles, each of which is one-half wave length at the mid-frequency of a band which the array is to receive. The dipoles (for the bands here specifically considered) are preferably disposed one above the other and are mounted horizontally to receive the horizontally polarized waves utilized for these purposes. Preferably also, they are center fed, with the shorter (higher frequency) of the two dipoles spaced from the longer one by a distance of at least the order of a quarter wave length of the high-frequency antenna. Both antennas are effectively connected in parallel to the same feeding system. The high-frequency antenna connects directly to the line, but there is interposed in the connection from the high-frequency antenna and the lower frequency antenna a circuit which is anti-resonant within the higher frequency band, and it is preferable that the anti-resonant circuit thus interposed be in the form of a tuned transmission line.

Figure 1:
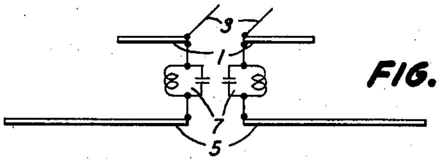
Fig. 1 is a circuit diagram schematically illustrating the array of my invention.

Considering the invention more in detail, and referring to Fig. 1, the reference character 1 indicates a simple high-frequency dipole which is fed by a transmission line 3 connected to the adjacent ends of the two half sections into which the dipole is divided. Spaced from the dipole 1 by a distance which should be at least of the order of magnitude of a quarter wave length of frequencies within the higher frequency band is the lower frequency dipole 5, the dimensions of which are such as to make it tuned to a half wave length of either the mid-frequency of the lower frequency band or, alternatively, to some frequency within that band at which it is desired that the antenna give its maximum response. The antenna 5 is center-fed from the transmission line 3 through a pair of anti-resonant circuits 7, each tuned to resonate at or about the natural frequency of the antenna 1, or at least to a frequency within the band to which this dipole is to respond.

Figure 3:
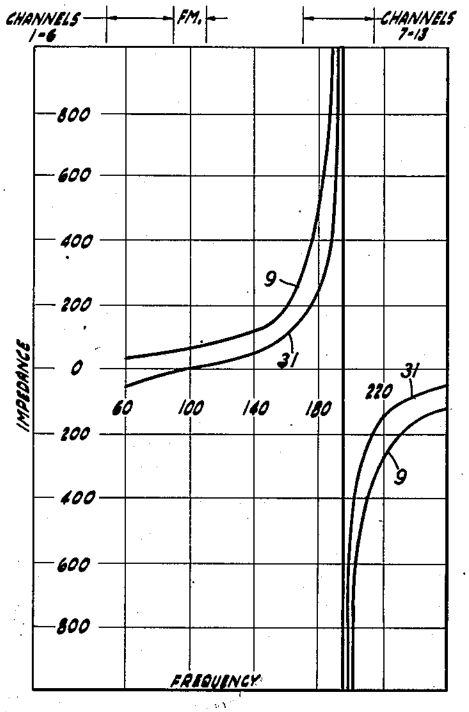
Fig. 3 shows graphs illustrating the variation of impedance with frequency of the resonant systems illustrated in Figs. 1 and 2A through 2E.

In Fig. 3 is shown a reactance diagram of the resonant circuit 7. At the top of this diagram are shown the locations of the bands assigned to television and frequency modulation, and it will be assumed throughout this detailed description that the array is to be designed for receiving these bands, although it is to be understood that the same principles can be applied to other frequency ranges. The resonant circuit 7 is in this case tuned to the mid-frequency of the band including television channels 7 to 13, or to about 195 megacycles. The curve 9 indicates the reactance of the resonant circuit throughout the range of frequency to which the array is designed to respond. At frequencies approaching 195 megacycles the reactance of this circuit approaches infinity (the actual value depending upon the resistance of the anti-resonant elements), the reactance being capacitive for frequencies above anti-resonance and inductive for lower frequencies. At the anti-resonant frequency, of course, the circuit offers an impedance which is purely resistive but very high.

It will be seen from examination of the diagram that even at the extreme frequencies in the high-frequency band, the reactance presented by each of the elements 7 is in the order of 400 ohms, and since, as viewed from the antenna 5, there are two of these elements in series, the total reactance offered will be double this. Viewed from antenna 1 and the transmission line, the circuit to antenna 5 looks like an infinite impedance when the frequency supplied to antenna 1 is 195 megacycles. At the extreme frequencies of the upper band, the impedance does not approach infinity, but it is still high, being approximately that of the two anti-resonant elements in series with the effective impedance of the antenna. The energy in the system divides in inverse ratio to that of the impedances, and as this ratio is least of the order of 4:1 in the least favorable portions of the band, and as the greater portion of the potential is expended across the anti-resonant elements, the proportion radiated by the long wave antenna is so small that it has no material effect on the field pattern.

Within the lower frequency bands, however, the impedance of the resonant elements is in all cases less than 100 ohms. Therefore, the performance of the antenna for the lower frequency bands is not materially affected.

A circuit of the type shown in Fig. 1, comprising an actual coil and condenser, while entirely possible, would be difficult to build into a satisfactory structure, and I therefore prefer to use tuned transmission lines for the anti-resonant elements, as shown in Figs. 2A to 2E, inclusive.

Figure 2A:
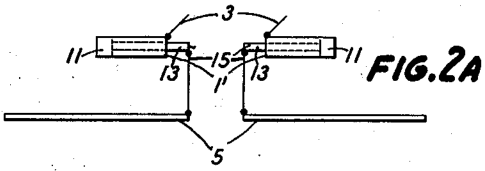
Figs. 2A through 2E are schematic drawings illustrating various modifications which are substantial electrical equivalents of the circuit shown in Fig. 1, the resonant elements in these latter figures being tuned transmission lines.

Of the various modifications shown in these figures, that shown in Fig. 2A has certain advantages from the purely structural point of view. In this figure the two arms 1' of the high-frequency antenna are tubular, and can be conveniently made of aluminum or copper, either with or without silver plating. The tubes are provided at their outer ends with metal plugs 11, secured to coaxial conducting rods 13. The transmission line 3 is connected to the inner end of the outer tubular conductors, and a short pair of leads 15 connects the supporting rods to the adjacent ends of the low-frequency antenna 5, the latter being in all essential matters identical with that shown in the first figure.

This structure is convenient for several reasons. The rods 13 are a sturdy and convenient method of supporting the structure. The conductor 13 and the outer tube 1' form a transmission line which is automatically tuned to the frequency within the range of the dipole, and substantially to its mid-frequency, for although the transmission line section is slightly shorter than that of the antenna arms themselves, owing to the thickness of the plugs 11, the capacity of the line section thus formed is sufficient to slow down the waves enough to make the tuning substantially exact.

The reactance diagram of a short-circuited quarter-length coaxial line of this character is identical with that of the reactance element 7. Moreover, the Q of such a circuit element is very high, so that the impedance may be considered to be equal to the reactance for all practical purposes.

Figure 2B:
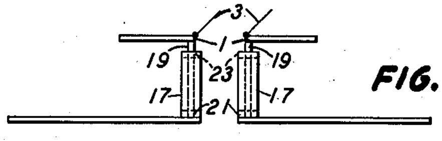

In Fig. 2B the two antennas 1 and 5 are the same as in the first figure, but the coaxial anti-resonant elements are formed in the leads between the two antennas. In this case the tubular conductors 17 connect to the antenna sections 5, while central conductors 19 terminate at the adjacent ends of the antenna sections 1. In this case the tuning of the anti-resonant lines is not determined by the length of the high-frequency antenna, but the short-circuiting plugs 21 may be adjusted to resonate at any desired frequency within the band. The supporting washers 23 at the upper ends of the tubular conductors should be of a low-loss insulating material, such as polystyrene. The impedance diagram is again the same as for the circuit shown in Fig. 1.

Figure 2C:
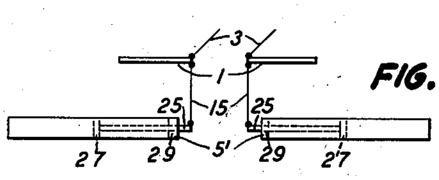

In Fig. 2C the antenna 1 is of the same construction as in Fig. 1, and is connected to the antenna 5' by the simple leads 15. In this case the anti-resonant elements are formed within the low-frequency dipole 5', which is formed as a conducting tube, the leads 15 connecting to central conductors 25. The latter terminate in conductive plugs 27, which are positioned within the antenna to give the proper tuning. Insulating support washers 29 may be provided for added rigidity.

Figure 2D:
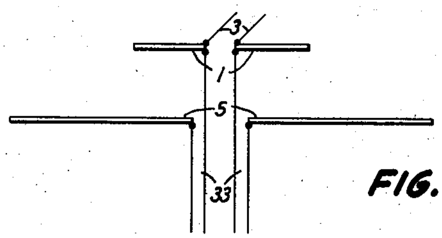

The form of the invention shown in Fig. 2D differs electrically as well as mechanically from those shown in the preceding figures. In this case the anti-resonant element is an open-ended half-wave line instead of a short-circuited quarter-wave line. It is still anti-resonant to a frequency within the high-frequency band, and this frequency to which it is anti-resonant is adjustable. A line of this character is, however, series-resonant at one-quarter wave length, and its reactance passes through zero at one-half of the frequency to which it offers maximum impedance. This is shown by curve 31 of Fig. 3, and it will be apparent, from an examination of this curve, that the impedances offered to the lower frequency band are in all cases lower than those offered by the quarter wave length shorted lines. The impedance offered at the exact anti-resonant frequency is, however, almost exactly the same as in the cases previously discussed, and therefore the structure may have considerable advantage in the case of transmitters, where only two frequencies need be considered. If these frequencies are exact multiples of each other, the tuned elements will offer substantially zero reactance and very low resistance at the lower frequency, and high impedance at the higher frequency, so that maximum effects can be secured on both.

In some instances somewhat similar effects can be obtained even though the frequencies are not exact multiples, and the open-ended half-wave line may be the choice where bands narrower than those primarily here considered are to be accommodated. It will also be understood, of course, that similar results are obtainable for short-circuited tuned lines of an odd number of quarter wave length as with those exactly one-quarter wave length long, and with open-circuited lines of even number of quarter wave length as with half wave length lines. In general, however, these are not so advantageous for the present purpose as those shown, since they involve additional points of resonance and anti-resonance.

Reverting again to Fig. 2D, the half-wave stubs are in this case shown as two-wire open lines 33. Quarter-wave open-wire lines could be inserted in a similar manner.

Figure 2E:
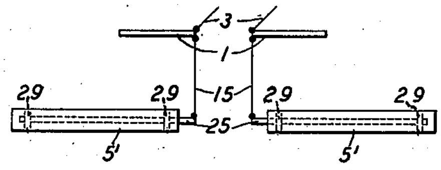

Fig. 2E shows the application of a coaxial half-wave open line within the low-frequency antenna 5'. The reference characters are the same as those used in connection with Fig. 2C, and the reactance diagram is that shown in curve 31. Other equivalent methods of inserting tuned lines, either coaxial or open wire, are obviously possible.

Turning now to the construction of a preferred form of my antenna as actually built, each arm of the low-frequency antenna is preferably constructed of a loop 41 of conductive tubing, which is folded back upon itself and welded or braized to a vertical extension 43 as is shown at the reference character 45, the inner end of the loop being angled upward where it approaches the extension 43 to give additional bracing and form a ready means of support. A rotatable joint 47 at the end of the extension 43 connects it with a conductor 49 which is bent outwardly to form the inner conductor of the high-frequency dipole. The outer conductor 51 is secured to the end of the inner one as has already been described in connection with the schematic showing of Fig. 2A. A terminal 53 is supplied at the inner end of the tubular conductor 51 for connection to the transmission line feeding the antenna array.

The two halves of the unit may be mounted upon a vertical support, such as the pipe 55. The structure is fastened to the pipe by means of an insulating bracket 57 secured to the angled portion of the loop 41. Because the support 57 is in the vicinity of a voltage node, the insulation problem here is not serious; the capactive connection across the loop need not be of high impedance and therefore the bracket may, if desired, be made of metal with sheet polystyrene, lava bushings, or other insulating materials, to isolate it from ground.

Figure 5:
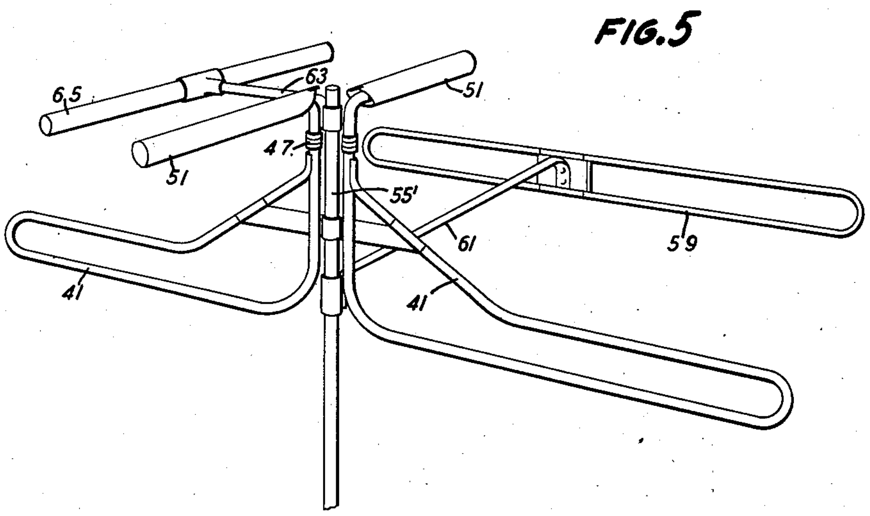
Fig. 5 is an isometric drawing illustrating a unit similar to that of Fig. 4 but provided with reflectors, and with the two dipoles constituting the array disposed at 90 degrees with respect to each other.

Fig. 5 shows how a dipole reflector 59 may be supported a quarter wave length back of the antenna 41 on an outrigger 61. It also shows the use of the rotatable joint 47 for swinging the antennas 51 at any angle up to 90 degrees from that occupied by the low-frequency antenna. Another outrigger or bracket 63, carried by an extension of the pipe 55', may be used to support a reflector 65 for the high-frequency antenna.

Figure 4:
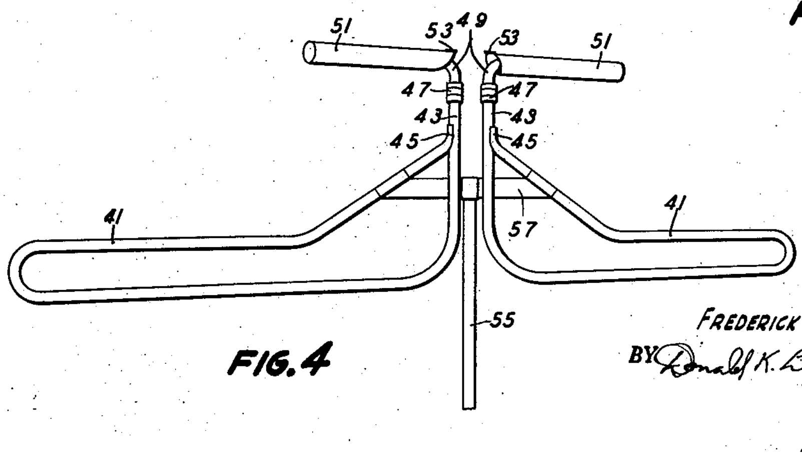
Fig. 4 is a drawing, showing, in elevation, a unit structure embodying my invention.
Figure 6:
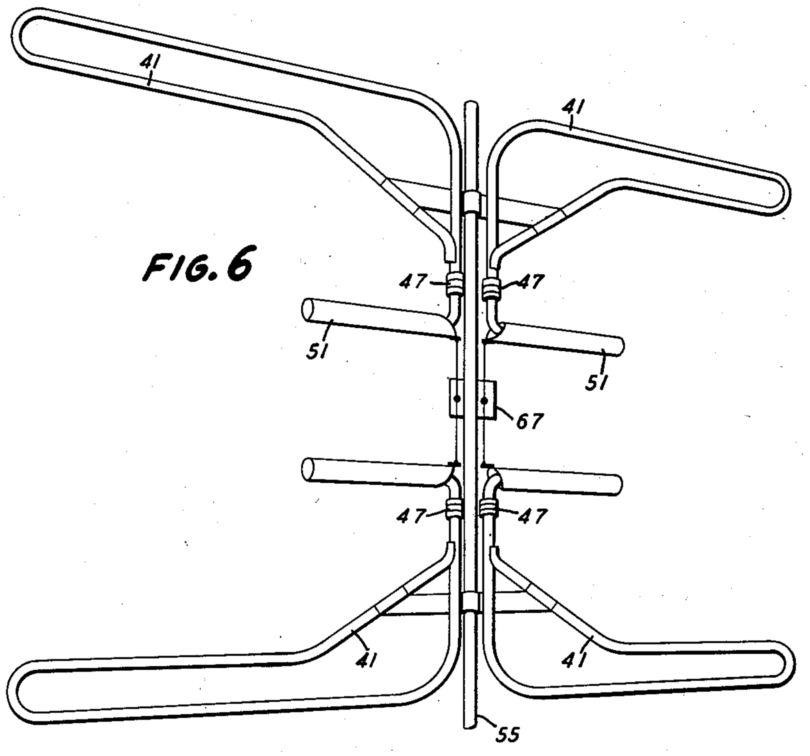
Fig. 6 is a drawing showing two of the units illustrated in Fig. 4 arranged as a two-bay stack.

Fig. 6 shows how two units of the type shown in Fig. 4 may be stacked, the upper unit inverted, to form a two-bay array. The principal elements of the combination are indicated by the reference characters used in Fig. 4. The array is shown as center fed, the transmission line (not shown) terminating in a connecting block 67. The two units will, under these circumstances, be excited in phase. All impedances, as viewed from the transmission line, will be cut approximately in half.

Figure 7:
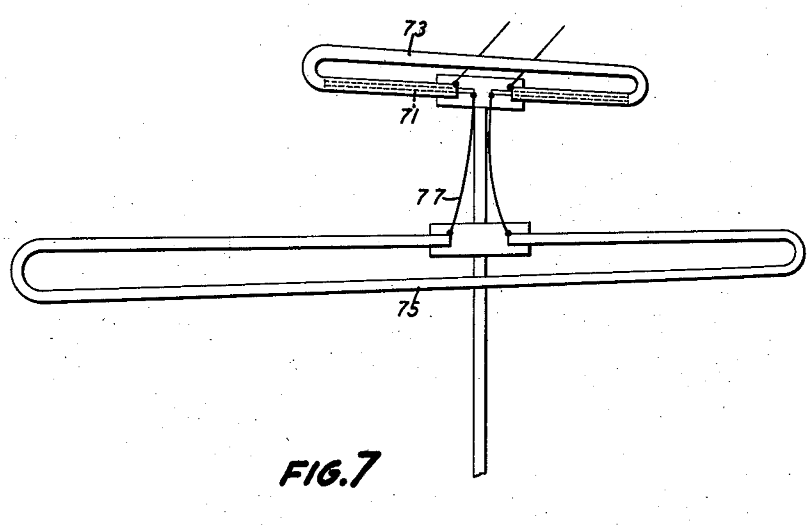
Fig. 7 is a semi-diagrammatic showing of my invention as applied to a folded dipole.

Fig. 7 shows the invention as adapted to feeding folded dipoles. This showing is largely diagrammatic. The anti-resonant circuits 71 are formed within the adjacent ends of the folded short-wave dipole 73. The long-wave dipole 75 is purely conventional for one of its type, and is fed, as before, through the anti-resonant section and the connecting lead 77.

The reciprocal relationship between transmitting and receiving antennas is well known, and it has already been indicated that antennas of this type may be utilized for transmitting purposes as well as for reception. By proper choice of frequencies and resonators, it is possible by the use of my invention to feed two antennas simultaneously over the same transmission line, and this has obvious advantages, particularly for military purposes.

Figure 8:
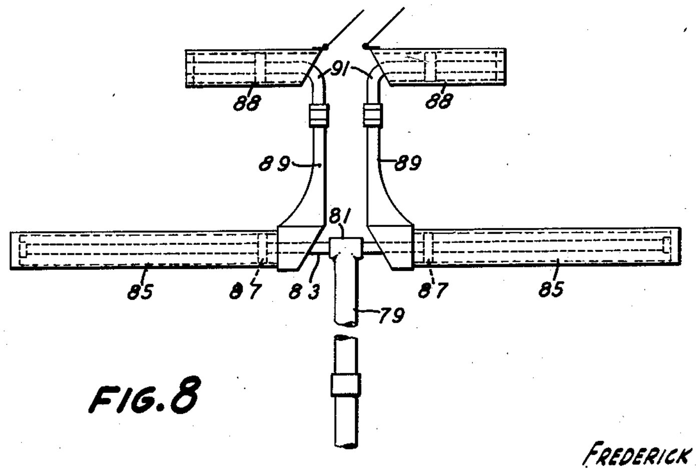
Fig. 8 is an elevation of a modified form of the invention adapted particularly for operation on two specific frequencies.

Fig. 8 illustrates a modification of the invention particularly adapted for transmitting on two specific frequencies, which possesses the advantage of requiring no exposed insulators. This antenna may be supported on a metal pipe or other suitable strut 79, which terminates in a T connection 81. The latter holds a central conductor 83 extending within tubular dipole sections 85 of the long-wave antenna, forming therewith an anti-resonant quarter-wave line at the lower frequency of operation. Insulating washers 87 give added rigidity to the structure.

The high-frequency tubular dipole sections 88 are supported from the sections 85 on conductive struts 89 which connect to central conductors 91 within the sections 88, forming quarter-wave lines as before, anti-resonant at the higher frequency.

While especially adapted to two-freqeuncy operation, this last modification will still operate well as a broad band device as will the others here described.

Other modifications than those herein referred to will doubtless occur to those skilled in the art, and the examples given are intended as illustrative and not as limiting, since I desire to have protection for this invention as broadly as possible within the scope of the appended claims.

I claim:

1. An antenna array comprising a pair of dipoles, one of said dipoles being tuned within a high frequency band and the other within a low frequency band, means for feeding energy to the center of said first mentioned dipole connections from the center of said first mentioned dipole to center feed said other dipole, and an element anti-resonant to substantially the mid frequency of said high frequency band interposed in each of said connections, said element comprising a coaxial transmission line.

2. An antenna array in accordance with claim 1 wherein said anti-resonant circuit comprises a short ciruited quarter wave transmission line.

3. An antenna array comprising a relatively short center-fed dipole, means for connecting a transmission line thereto a longer center-fed dipole, and power supply connections between said dipoles, said connections including a shorted coaxial transmission line formed within said short dipole and of substantially equal length therewith.

4. A center-fed dipole antenna array comprising a shorter dipole section means for connecting a transmission line to said section, a longer dipole section and a section connecting the mid points of said other sections, one of said sections including tubular portions each of substantially one-half the length of said shorter dipole section and a central conductor within each of said tubular portions and connected thereto at one end and to an adjacent section at the other, thereby forming an anti-resonant transmission line interposed between said dipoles.

5. An antenna array comprising a relatively long dipole structure consisting of a pair of mutually insulated horizontal arms, a pair of vertical extensions from the adjacent ends of said arms, a pair of shorter horizontal arms extending from said vertical extensions and supported thereby, a tubular conductor surrounding and supported by each of said shorter arms and electrically connected thereto at their outer ends only and means for connecting a transmission line to the inner ends of said tubular conductors.

6. An antenna array in accordance with claim 5 including a rotatable joint in each of said vertical extensions.

7. An antenna array comprising a pair of rigid rod-like conductors each of L shape and having a horizontally extending arm and a vertically extending arm, a pair of shorter rigid horizontal arms each electrically connected to and mechanically supported by the end of one of said vertically extending arms, a rigid tubular conductor surrounding each of said shorter arms and supported thereby and electrically connected thereto at the outer ends thereof only, an insulated mechanical supporting member connecting said arms and means for connecting a transmission line to the inner ends of said tubular conductors.

8. An antenna array comprising a pair of rigid conductors, each formed into an L shape with a horizontal arm and a vertical arm, the ends of each of said horizontal arms being looped back and secured to said vertical arms, a shorter rigid horizontal conductor secured to the end of each of said vertical arms and electrically connected thereto, a rigid tubular conductor surrounding each of said shorter horizontal conductors and supported thereby, and electrically connected thereto at the outer end only, an insulated support bracket mechanically connecting said first-mentioned pair of conductors to maintain said vertical arms substantially parallel with said horizontal arms extending in opposite directions and means for connecting a transmission line to the inner ends of said tubular conductors.

9. An antenna array in accordance with the claim 6 wherein said shorter horizontal conductors are connected to said vertical arms by rotatable joints turning about a vertical axis whereby the orientation of said shorter horizontal conductors may be individually adjusted.

FREDERICK A. KOLSTER.

REFERENCES CITED

The following references are of record in the file of this patent:

UNITED STATES PATENTS

| Number | Name | Date |
|---|---|---|
| 2,110,159 | Landon | Mar. 8, 1938 |
| 2,255,520 | Schuster | Sept. 9, 1941 |
| 2,272,608 | Hoffman | Feb. 10, 1942 |
| 2,281,429 | Goddard | Apr. 28, 1942 |
| 2,311,364 | Buschbeck et al. | Feb. 16, 1943 |
| 2,350,916 | Morrison | June 6, 1944 |
| 2,417,290 | Brown | Mar. 11, 1947 |
| 2,420,967 | Moore | May 20, 1947 |
| 2,432,858 | Brown | Dec. 16, 1947 |
| 2,474,480 | Kearse | June 28, 1949 |
| 2,510,010 | Callaghan | May 30, 1950 |

OTHER REFERENCES

Electronics, May 1947, page 99.

Radio News, October, 1948, page 99.